(12) United States Patent
Junod

(10) Patent No.: US 9,488,104 B2
(45) Date of Patent: Nov. 8, 2016

(54) GAS TURBINE ENGINE LUBRICATION SYSTEM

(71) Applicant: Rolls-Royce Corporation, Indianapolis, IN (US)

(72) Inventor: Larry A. Junod, Greencastle, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 513 days.

(21) Appl. No.: 14/109,114

(22) Filed: Dec. 17, 2013

(65) Prior Publication Data

US 2014/0271118 A1 Sep. 18, 2014

Related U.S. Application Data

(60) Provisional application No. 61/801,866, filed on Mar. 15, 2013.

(51) Int. Cl.

| F02C 7/06 | (2006.01) |
|---|---|
| F16N 7/32 | (2006.01) |
| F01D 25/12 | (2006.01) |
| F01D 25/18 | (2006.01) |
| F16N 7/38 | (2006.01) |
| F01D 25/08 | (2006.01) |
| F02C 7/12 | (2006.01) |

(52) U.S. Cl.
CPC ............... *F02C 7/06* (2013.01); *F01D 25/08* (2013.01); *F01D 25/125* (2013.01); *F01D 25/18* (2013.01); *F02C 7/12* (2013.01); *F16N 7/32* (2013.01); *F16N 7/385* (2013.01); *F05D 2260/98* (2013.01)

(58) Field of Classification Search
CPC .......... F02C 7/06; F02C 7/12; F01D 25/125; F01D 25/18; F01D 25/22; F01D 25/08; F16N 7/32; F05D 2260/213; F05D 2260/232; F05D 2260/98
See application file for complete search history.

(56) References Cited

U.S. PATENT DOCUMENTS

| 2,531,411 | A | * | 11/1950 | Davenport | F01D 25/18 |
| | | | | | 184/55.2 |
| 2,883,152 | A | | 4/1959 | Turunen et al. | |
| 3,321,910 | A | | 5/1967 | William et al. | |
| 4,136,516 | A | | 1/1979 | Corsmeier | |
| 4,717,000 | A | | 1/1988 | Waddington et al. | |
| 4,888,947 | A | | 12/1989 | Thompson | |
| 4,991,391 | A | | 2/1991 | Kosinski | |
| 5,018,601 | A | | 5/1991 | Waddington et al. | |
| 5,579,631 | A | | 12/1996 | Chen et al. | |
| 6,295,803 | B1 | | 10/2001 | Bancalari | |
| 6,672,075 | B1 | | 1/2004 | Sandu et al. | |
| 7,475,549 | B2 | * | 1/2009 | Alexander | F01D 15/10 |
| | | | | | 415/121.2 |
| 7,748,209 | B1 | * | 7/2010 | Schopf | F01D 5/082 |
| | | | | | 60/39.08 |
| 8,215,895 | B2 | * | 7/2012 | Henry | F01D 9/065 |
| | | | | | 415/1 |
| 9,222,411 | B2 | * | 12/2015 | Sennoun | F02C 7/185 |
| 2009/0220330 | A1 | * | 9/2009 | Henry | F01D 9/065 |
| | | | | | 415/111 |
| 2010/0154434 | A1 | * | 6/2010 | Kubota | F02C 7/18 |
| | | | | | 60/785 |

OTHER PUBLICATIONS

International Search Report for PCT International Application Serial No. PCT/US2013/075839, completed Apr. 11, 2014, (8 pages).

* cited by examiner

*Primary Examiner* — Richard Edgar
*Assistant Examiner* — Jesse Prager
(74) *Attorney, Agent, or Firm* — Barnes & Thornburg LLP

(57) ABSTRACT

A lubrication system for a gas turbine engine is disclosed. The lubrication system is configured to provide pressurized air and lubricant to a bearing sump of the gas turbine engine to cool and lubricate a bearing included in the bearing sump.

20 Claims, 2 Drawing Sheets

GAS TURBINE ENGINE LUBRICATION SYSTEM

CROSS REFERENCE TO RELATED APPLICATIONS

This application claims priority to and the benefit of U.S. Provisional Patent Application No. 61/801,866, filed 15 Mar. 2013, the disclosure of which is now expressly incorporated herein by reference.

TECHNICAL FIELD

The present invention generally relates to gas turbine engines, and more particularly, but not exclusively, to bearing lubrication systems for gas turbine engines.

BACKGROUND

Typical bearing lubrication systems for gas turbine engines utilize heat exchangers to absorb heat from oil that is recirculated through the system once the oil is delivered to the bearings. Heat absorbed from the oil by the heat exchanger in those systems is transferred to either air passing through the gas turbine engine or fuel injected into the gas turbine engine. Those systems are difficult to integrate into gas turbine engines producing propulsive thrust at supersonic speeds because the temperature of the air passing through the gas turbine engine and the temperature of the fuel injected into the gas turbine engine is often higher than the bearings can withstand in normal operating conditions. In view of the difficulty inherent in recirculating systems, providing a bearing lubrication system for a gas turbine engine producing propulsive thrust at supersonic speeds that does not utilize recirculated oil remains an area of interest.

SUMMARY

An illustrative gas turbine engine is adapted for one-time or limited use in high subsonic or supersonic applications. The gas turbine engine includes an engine core, a bearing sump, and a non-recirculating lubrication system arranged in the engine core and coupled to the bearing sump. The non-recirculating lubrication system is configured to provide pressurized air and lubricant to the bearing sump to lubricate and cool bearings included in the bearing sump. The non-recirculating lubrication system then conducts the lubricant and the pressurized air to the atmosphere so that the lubricant is not recirculated back to the bearing sump.

According to one aspect of the present disclosure, a gas turbine engine may include an engine core, a bearing sump, and a non-recirculating lubrication system. The engine core may include an inlet, a compressor, a turbine, and an exhaust. The bearing sump may be arranged in the engine core. The non-recirculating lubrication system may include a lubricant reservoir, an air system, and a vent. The lubricant reservoir may be coupled to the bearing sump to provide lubricant to the bearing sump. The air system may be coupled to the bearing sump and configured to provide pressurized air to the bearing sump to cool a bearing included in the bearing sump and to blow lubricant onto the bearing. The vent may be coupled to the bearing sump and to the atmosphere, and the vent may be sized to conduct the lubricant provided by the lubricant reservoir and pressurized air provided by the air system to the atmosphere after the lubricant and pressurized air enter the bearing sump so that the lubricant is not recirculated in the bearing sump.

In some embodiments, the vent may be coupled to the exhaust of the engine core so that the lubricant and pressurized air conducted away from the bearing sump is deposited into an air stream exiting the gas turbine engine. The air system may include a delivery line coupled to the bearing sump to deliver pressurized air to the bearing sump, and the air system may further include an interstage compressor bleed line coupled to the compressor to receive pressurized air from the compressor for transportation to the bearing by the delivery line. The air system may further include an inlet bleed line coupled to the inlet to receive pressurized air from the inlet for transportation to the bearing by the delivery line. The air system may further include a bleed selection valve configured to selectively couple the delivery line to the interstage compressor bleed line or the inlet bleed line.

In some embodiments, the air system may further include a heat exchanger filled with a coolant and configured to cool pressurized air before delivery to the bearing sump. The air system may further include a vent valve coupled to the heat exchanger and configured to vent coolant to the atmosphere during operation of the gas turbine engine based on the temperature of the coolant to control pressure and phase of the coolant in the heat exchanger in order to provide a predetermined amount of cooling to pressurized air passing through the heat exchanger. The air system may further include a bypass valve configured to selectively bypass the heat exchanger to deliver uncooled pressurized air to the bearing sump.

According to another aspect of the present disclosure, a gas turbine engine may include an engine core, a bearing sump, and an air system. The engine core may include an inlet, a compressor, a turbine, and an exhaust. The bearing sump may be arranged in the engine core. The air system may be coupled to the bearing sump and configured to provide pressurized air to the bearing sump to cool a bearing included in the bearing sump. The air system may include a delivery line, a first bleed line, a heat exchanger, and a vent valve. The delivery line may be coupled to the bearing sump to deliver pressurized air to the bearing sump. The first bleed line may be coupled to the engine core to receive pressurized air from the engine core for transportation to the bearing by the delivery line. The heat exchanger may be filled with a coolant and may be coupled between the delivery line and the first bleed line to cool air before delivery to the bearing sump. The vent valve may be coupled to the heat exchanger and configured to vent coolant to the atmosphere during operation of the gas turbine engine based on the temperature of the coolant to control pressure and phase of the coolant in the heat exchanger in order to provide a predetermined amount of cooling to pressurized air passing through the heat exchanger.

In some embodiments, the air system may include a bypass valve configured to selectively bypass the heat exchanger to deliver uncooled pressurized air from the engine core to the bearing sump if the air temperature at the first bleed line is below a predetermined temperature. The air system may further include a second bleed line coupled to the engine core to receive pressurized air from a different part of the engine core for transportation to the bearing by the delivery line, and the air system may further include a bleed selection valve configured to selectively couple the delivery line to the first bleed line or the second bleed line. The heat exchanger may be coupled between the delivery line and the second bleed line. The first bleed line may be coupled to the inlet of the engine core, and the second bleed line may be coupled to the compressor of the engine core.

In some embodiments, the gas turbine engine may further comprise a lubrication reservoir coupled to the bearing sump to provide lubricant to the bearing sump, and the gas turbine engine may further comprise a vent line coupled to the bearing sump and the atmosphere to conduct lubricant from the bearing sump to the atmosphere. The vent line may be sized to conduct the lubricant from the lubricant reservoir and pressurized air from the air system to the atmosphere from the bearing sump so that lubricant is not recirculated in the bearing sump.

According to yet another aspect of the present disclosure, a method for operating a gas turbine engine is disclosed. The method may include conducting lubricant from a lubricant reservoir to a bearing sump included in the gas turbine engine, conducting pressurized air to the bearing sump from an engine core included in the gas turbine engine to blow the lubricant onto a bearing included in the bearing sump, and venting substantially all of the lubricant and pressurized air from the bearing sump to the atmosphere without recirculating the lubricant so that heat absorbed from the bearing sump by the lubricant and the pressurized air is removed from the bearing sump.

In some embodiments, the method may further comprise cooling the pressurized air from the engine core by passing the pressurized air through a heat exchanger filled with coolant. The method may further comprise venting coolant from the heat exchanger during operation of the gas turbine engine based on the temperature of the coolant to control pressure and phase of the coolant in the heat exchanger in order to provide a predetermined amount of cooling to pressurized air passing through the heat exchanger.

Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
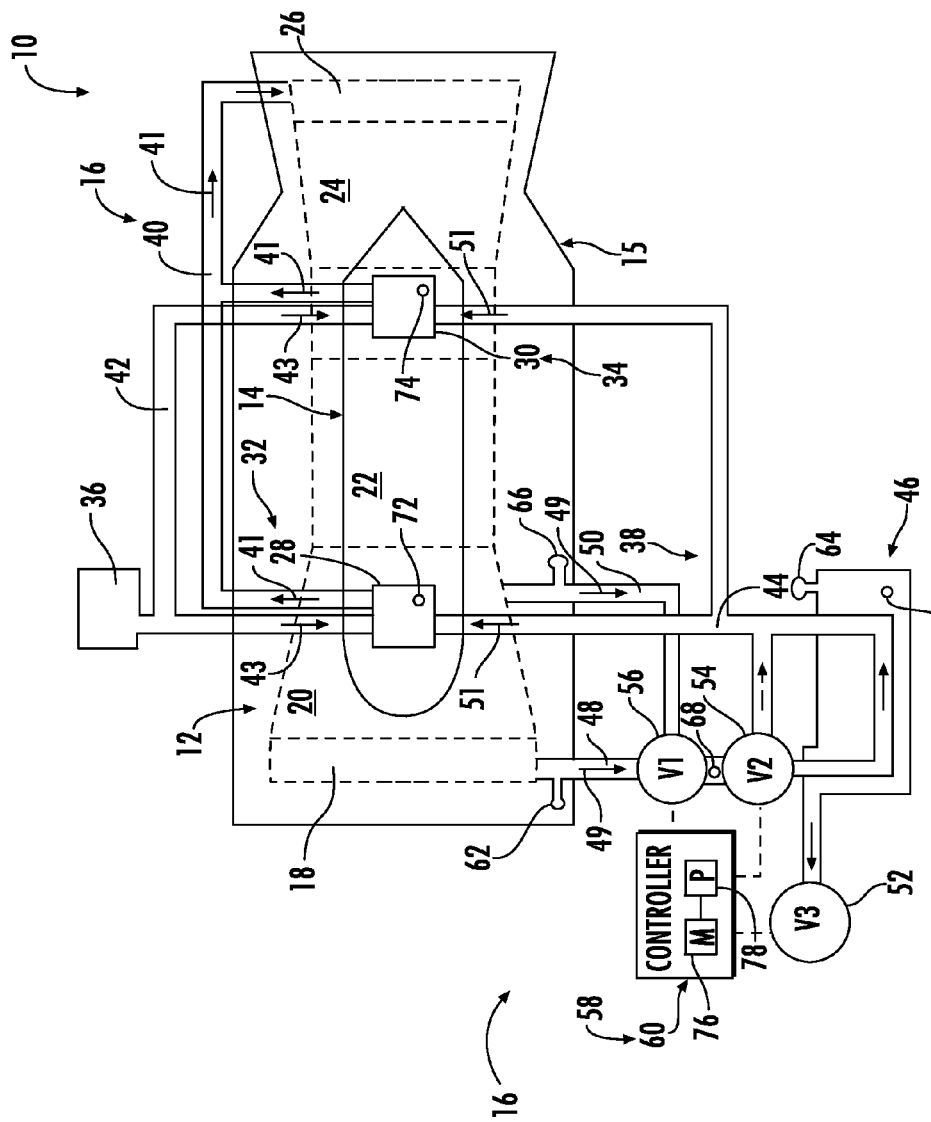
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

An illustrative gas turbine engine 10 is adapted for one-time or limited use in high subsonic or supersonic applications as shown in FIG. 1. The gas turbine engine 10 includes an engine core 12, a bearing sump 14, and a non-recirculating lubrication system 16. The non-recirculating lubrication system 16 is configured to provide pressurized air from the engine core 12 and lubricant to the bearing sump 14 to lubricate and cool a plurality of bearings 28, 30 included in the bearing sump 14. The non-recirculating lubrication system 16 then conducts the lubricant and the pressurized air to the atmosphere so that the lubricant is not recirculated back to the bearing sump 14.

The engine core 12 is illustratively shown in FIG. 1 as being surrounded by a housing 15 that supports an inlet 18, a compressor 20, a combustor 22, a turbine 24, and an exhaust 26 of the engine core 12. The bearing sump 14 is arranged in the engine core 12 within the housing 15 as shown in FIG. 1. The non-recirculating lubrication system 16 is also mounted to the housing 15 and extends into the bearing sump 14 inside the housing 15.

The engine core 12 of the gas turbine engine 10 includes the inlet 18, the compressor 20, the combustor 22, the turbine 24, and the exhaust 26 as indicated above and shown in FIG. 1. The inlet 18 is configured to receive atmospheric air and deliver the atmospheric air to the compressor 20. The compressor 20 is configured to increase the pressure and the temperature of the atmospheric air provided to the compressor 20 from the inlet 18 and deliver the air at the increased pressure and temperature to the combustor 22. The combustor 22 is configured to mix the air provided by the compressor 20 with fuel, ignite the air/fuel mixture, and deliver the resulting hot, high-pressure gasses to the turbine 24. The turbine 24 is configured to convert the hot, high-pressure gasses provided by the combustor 22 to mechanical energy (i.e., power) that is used to drive one or more components of the gas turbine engine 10 (e.g., the compressor 20) and deliver the hot, high-pressure gasses to the exhaust 26. The exhaust 26 is configured to discharge the hot, high-pressure gasses from the turbine 24 to a low pressure air stream producing thrust.

Rotating components of the compressor 20 and the turbine 24 are mounted on a shaft (not shown) and coupled to one another through the shaft so that power extracted by the turbine 24 is transmitted to the compressor 20 via the shaft. The shaft is supported for rotation at one end by the bearing 28 associated with the compressor 20, and the shaft is supported for rotation at an opposite end by the bearing 30 associated with the turbine 24.

The bearing sump 14 is illustratively shown in FIG. 1 as extending from the compressor 20 to the turbine 24 so that the bearing sump 14 is arranged in the engine core 12 between the inlet 18 and the exhaust 26. The bearing sump 14 is illustratively split into a compressor sump 32 and a turbine sump 34. The compressor sump 32 includes the bearing 28 and the turbine sump 34 includes the bearing 30 as discussed below.

The compressor sump 32 includes the bearing 28, a housing (not shown), and a mister (not shown). The housing contains the mister and the bearing 28, and the housing is positioned in the compressor 20 as shown in FIG. 1. The mister may be a nozzle configured to inject air, lubricant, or a mixture of air and lubricant into the bearing 28 so that the bearing 28 is adequately lubricated and cooled during operation of the gas turbine engine 10. The bearing 28 may be a ball bearing configured to absorb radial and axial loads transmitted to the bearing 28 from the shaft, or alternatively, a cylindrical roller bearing configured to absorb radial loads transmitted to the bearing 28 from the shaft. The bearing 28 may be selected to account for thermal expansion and retraction occurring along the shaft during the operation of the gas turbine engine 10. The non-recirculating lubrication system 16 is configured to provide at least one of pressurized air and a mixture of pressurized air and lubricant to the bearing sump 14 to cool the bearing 28 of the compressor sump 32.

The turbine sump 34 includes the bearing 30, a housing (not shown), and a mister (not shown). The housing contains the mister and the bearing 28, and the housing is positioned in the turbine 24 as shown in FIG. 1. The mister may be a nozzle configured to inject air, lubricant, or a mixture of air and lubricant into the bearing 30 so that the bearing 30 is adequately lubricated and cooled during operation of the gas turbine engine 10. The bearing 30 may be a cylindrical roller bearing configured to absorb radial loads transmitted to the bearing 30 from the shaft, or alternatively, a ball bearing configured to absorb radial and axial loads transmitted to the bearing 30 from the shaft. The bearing 30 may be selected to account for thermal expansion and retraction occurring along the shaft during the operation of the gas turbine engine 10. The non-recirculating lubrication system 16 is configured to provide at least one of pressurized air and a mixture of pressurized air and lubricant to the bearing sump 14 to cool the bearing 30 of the turbine sump 34.

As indicated above, the non-recirculating lubrication system 16 is configured to provide at least one of pressurized air and a mixture of pressurized air and lubricant to the bearing sump 14 to lubricate and cool the bearings 28, 30 during operation of the gas turbine engine 10. The non-recirculating lubrication system 16 includes a lubricant reservoir 36, an air system 38, and a vent 40 as shown in FIG. 1.

As suggested in FIG. 1, the lubricant reservoir 36 is configured to provide a lubricant stored therein, using pressurized air from the gas turbine engine 10, to the bearing sump 14. The lubricant provided to the bearings 28, 30 cools and lubricates the bearings 28, 30 of the compressor sump 32 and the turbine sump 34. The lubricant reservoir also includes a lubricant delivery line 42 which couples the lubricant reservoir 36 to the compressor sump 32 and the turbine sump 34 as shown in FIG. 1. The lubricant delivery line 42 provides lubricant to the bearings 28, 30 to cool and lubricate the bearings 28, 30 from the lubricant reservoir 36 as suggested by the arrows 43 shown in FIG. 1.

The lubricant may be an oil mist, an ester, a specialized lubricant such as Durad®, or any other suitable bearing lubricant which may be carried to the compressor and turbine sumps 32, 34 with pressurized air from the gas turbine engine 10. Lubricant provided to the compressor and turbine sumps 32, 34 may be injected into the bearings 28, 30 by the misters included in each of the sumps 32, 34.

The air system 38 is configured to provide pressurized air from the gas turbine engine 10 to the bearing sump 14 to cool the bearings 28, 30 and to blow lubricant onto the bearings 28, 30 as suggested in FIG. 1. The air system 38 includes a plurality of bleed lines, a delivery line 44, the heat exchanger 46, and a plurality of control valves as shown in FIG. 1.

The plurality of bleed lines of the air system 38 includes an inlet bleed line 48 and an interstage compressor bleed line 50 as shown in FIG. 1. Both the inlet bleed line 48 and the interstage compressor bleed line 50 are configured to receive pressurized air from the engine core 12. The inlet bleed line 48 is fluidly coupled to the inlet 18 to receive pressurized air from the inlet 18. The interstage compressor bleed line 50 is fluidly coupled to the compressor 20 to receive pressurized air from the compressor 20. In the illustrative embodiment, pressurized air is provided to each of the lines 48, 50 in the direction shown by the arrows 49 in FIG. 1. Pressurized air is provided to the inlet bleed line 48 at a lower pressure than the pressurized air provided to the interstage compressor bleed line 50. Pressurized air is provided to the inlet bleed line 48 and the interstage compressor bleed line 50 for transportation to the bearings 28, 30 of the bearing sump 14 through the delivery line 44 as discussed herein.

The delivery line 44 of the air system 38 is fluidly coupled to the bearing sump 14 to deliver pressurized air transported to the delivery line 44 from at least one of the inlet bleed line 48 and the interstate compressor bleed line 50 to the bearings 28, 30 as suggested in FIG. 1. Pressurized air is delivered to the bearing sump 14 from the delivery line 44 in the direction shown by the arrows 51 in FIG. 1. The delivery line 44 is also fluidly coupled to the heat exchanger 46 to receive pressurized air that is cooled by the heat exchanger 46 prior to being delivered to the bearings 28, 30 through the delivery line 44.

The heat exchanger 46 of the air system 38 is configured to cool pressurized air provided to the heat exchanger 46 as suggested in FIG. 1. The heat exchanger 46 receives pressurized air from at least one of the inlet bleed line 48 and the interstage compressor bleed line 50 before the pressurized air is delivered to the bearing sump 14 through the delivery line 44. The heat exchanger 46 is arranged between the lines 48, 50 and the delivery line 44 as shown in FIG. 1. The heat exchanger 46 is filled with a coolant (not shown) operable to absorb heat from the pressurized air to reduce the temperature of the pressurized air. The coolant is illustratively embodied as water. However, the coolant may be ice, methanol, ethanol, isopropyl alcohol, glycol, other coolants, or mixtures thereof. As discussed below, the plurality of control valves includes the vent valve 52 fluidly coupled to the heat exchanger 46 and a bypass valve 54 fluidly coupled to the heat exchanger 46.

The plurality of control valves of the air system 38 includes the vent valve 52 as shown in FIG. 1. The vent valve 52 is configured to selectively vent coolant from the heat exchanger 46 to the atmosphere during operation of the gas turbine engine 10 as suggested in FIG. 1. The vent valve 52 is illustratively shown as a one-way valve that receives coolant from the heat exchanger 46 and delivers the coolant to the atmosphere. The vent valve 52 is configured to vent coolant to the atmosphere during the operation of the gas turbine engine 10 based on the temperature of the coolant to control the pressure and phase of the coolant in order to provide a predetermined amount of cooling to the pressurized air passing through the heat exchanger 46.

The plurality of control valves of the air system 38 includes the bypass valve 54 as shown in FIG. 1. The bypass valve 54 is configured to selectively bypass the heat exchanger 46 so that pressurized air provided to the bypass valve 54 is transported to the delivery line 44 and therethrough to the bearings 28, 30 without being cooled by the heat exchanger 46. The bypass valve 54 is also configured to selectively deliver pressurized air to the heat exchanger 46 for cooling using the heat exchanger 46. The bypass valve 54 is illustratively shown as a two-way valve that receives pressurized air from at least one of the inlet 18 and the compressor 20 and delivers the pressurized air to either the delivery line 44 or the heat exchanger 46 as indicated above.

The plurality of control valves of the air system 38 includes the bleed selection valve 56 as shown in FIG. 1. The bleed selection valve 56 is configured to selectively couple the inlet bleed line 48 or the interstage compressor line 50 to the delivery line 44 by way of the bypass valve 54 or the heat exchanger 46 as shown in FIG. 1. The bleed selection valve 56 is illustratively shown as a two-way valve that receives pressurized air from both the inlet bleed line 48 and the interstage compressor bleed line 50 and delivers the pressurized air to the bypass valve 54. The bleed selection valve 56 is fluidly coupled to the inlet 18 through the inlet bleed line 48 and to the compressor 20 through the interstage compressor bleed line 50 as shown in FIG. 1.

The vent 40 of the non-recirculating lubrication system 16 is coupled to the bearings 28, 30 in the bearing sump 14 and the atmosphere through the exhaust 26 of the engine core 12 as shown in FIG. 1. The vent 40 is sized to conduct pressurized air provided to the bearings 28, 30 from the delivery line 44 away from the bearing sump 14 in the direction of the arrows 41 shown in FIG. 1. The vent 40 is also sized to conduct lubricant provided to the bearings 28, 30 from the lubricant delivery line 42 away from the bearing sump 14 in the direction of the arrows 41 shown in FIG. 1. The vent 40 conducts pressurized air and lubricant absorbing heat from the bearings 28, 30 away from the bearing sump 14 and deposits the pressurized air and lubricant into an atmospheric air stream exiting the gas turbine engine 10. As such, pressurized air and lubricant entering the bearing sump 14 are not recirculated in the bearing sump 14.

Each of the bearings 28, 30 is operable at temperatures at or below an acceptable operating temperature during operation of the gas turbine engine 10. The bearings 28, 30 may be selected so that the acceptable operating temperature associated with each of the bearings 28, 30 is approximately the same. Alternatively, the bearings 28, 30 may be selected so that the acceptable operating temperature associated with one of the bearings 28, 30 differs from the other of the bearings 28, 30.

The gas turbine engine 10 further includes a control system 58 that includes a plurality of sensors and a controller 60 as shown in FIG. 1. The control system 58 is configured to control the operation of the plurality of valves of the air system 38 using the plurality of sensors and the controller 60 to effect control of the non-recirculating lubrication system 16 during operation of the gas turbine engine 10 as suggested in FIG. 2.

The plurality of sensors of the control system 58 includes pressure sensors 62, 64, 66 and temperature sensors 68, 70, 72, 74 as shown in FIG. 1. The controller 60 is electrically coupled to each of the sensors 62, 64, 66, 68, 70, 72, and 74. In addition, the controller 60 is electrically coupled to the bleed selection valve 56, the bypass valve 54, and the vent valve 52.

The pressure sensor 62 of the control system 58 is configured to measure the pressure of pressurized air flowing through the inlet bleed line 48 as suggested in FIG. 1. The pressure sensor 62 sends an input signal to the controller 60 indicative of the measured pressure. The pressure sensor 62 is illustratively positioned between the inlet 18 and the bleed selection valve 56 as shown in FIG. 1. In another embodiment, the sensor 62 may be positioned within the inlet 18. Although the sensor 62 is utilized to measure the pressure of pressurized air flowing through the inlet bleed line 48 in the illustrative embodiment, that pressure may be calculated based on other parameters of the gas turbine engine 10 without using the sensor 62.

The pressure sensor 64 of the control system 58 is configured to measure the pressure of coolant residing in the heat exchanger 46 as suggested in FIG. 1. The pressure sensor 64 sends an input signal to the controller 60 indicative of the measured pressure of the coolant. The pressure sensor 64 is illustratively positioned in the heat exchanger 46 as shown in FIG. 1.

The pressure sensor 66 of the control system 58 is configured to measure the pressure of pressurized air flowing through the interstage compressor bleed line 50 as shown in FIG. 1. The pressure sensor 66 sends an input signal to the controller 60 indicative of the measured pressure of the pressurized air. The pressure sensor 66 is illustratively positioned between the compressor 20 and the bleed selection valve 56 as shown in FIG. 1. In another embodiment, the pressure sensor 66 may be positioned within the compressor 20. Although the sensor 66 is utilized to measure the pressure of pressurized air flowing through the interstage compressor bleed line 50 in the illustrative embodiment, that pressure may be calculated based on other parameters of the gas turbine engine 10 without using the sensor 66.

The temperature sensor 68 of the control system 58 is configured to measure the temperature of pressurized air delivered from the bleed selection valve 56 to the bypass valve 54 as shown in FIG. 1. The temperature sensor 68 sends an input signal to the controller 60 indicative of the measured temperature of the pressurized air. The temperature sensor 68 is illustratively positioned between the bleed selection valve 56 and the bypass valve 54 as shown in FIG. 1. Although the sensor 68 is utilized to measure the temperature of pressurized air delivered from the bleed selection valve 56 to the bypass valve 54 in the illustrative embodiment, that pressure may be calculated based on other parameters of the gas turbine engine 10 without using the sensor 68.

The temperature sensor 70 of the control system 58 is configured to measure the temperature of coolant residing in the heat exchanger 46 as suggested in FIG. 1. The temperature 70 sends an input signal to the controller 60 indicative of the measured temperature of the coolant. The temperature sensor 70 is illustratively positioned in the heat exchanger 46 as shown in FIG. 1.

The temperature sensor 72 of the control system 58 is configured to measure the temperature of the bearing 28 as suggested in FIG. 1. The temperature sensor 72 sends an input signal to the controller 60 indicative of the measured temperature of the bearing 28. The temperature sensor 72 is illustratively positioned in the compressor sump 32 as shown in FIG. 1. Although the sensor 72 is utilized to measure the temperature of the bearing 28 in the illustrative embodiment, that temperature may be calculated based on other parameters of the gas turbine engine 10 without using the sensor 72.

The temperature sensor 74 of the control system 58 is configured to measure the temperature of the bearing 30 as suggested in FIG. 1. The temperature sensor 74 sends an input signal to the controller 60 indicative of the measured temperature of the bearing 30. The temperature sensor 74 is illustratively positioned in the turbine sump 34 as shown in FIG. 1. Although the sensor 74 is utilized to measure the temperature of the bearing 30 in the illustrative embodiment, that temperature may be calculated based on other parameters of the gas turbine engine 10 without using the sensor 74.

The controller 60 includes a memory 76 and a processor 78 coupled to the memory 76 as shown in FIG. 1. The memory 76 includes instructions stored therein that are executable by the processor 78 to cause the controller 60 to perform an operational sequence 100 during operation of the gas turbine engine 10 to effect control of the non-recirculating lubrication system 16 as shown in FIG. 2.

Figure 2:
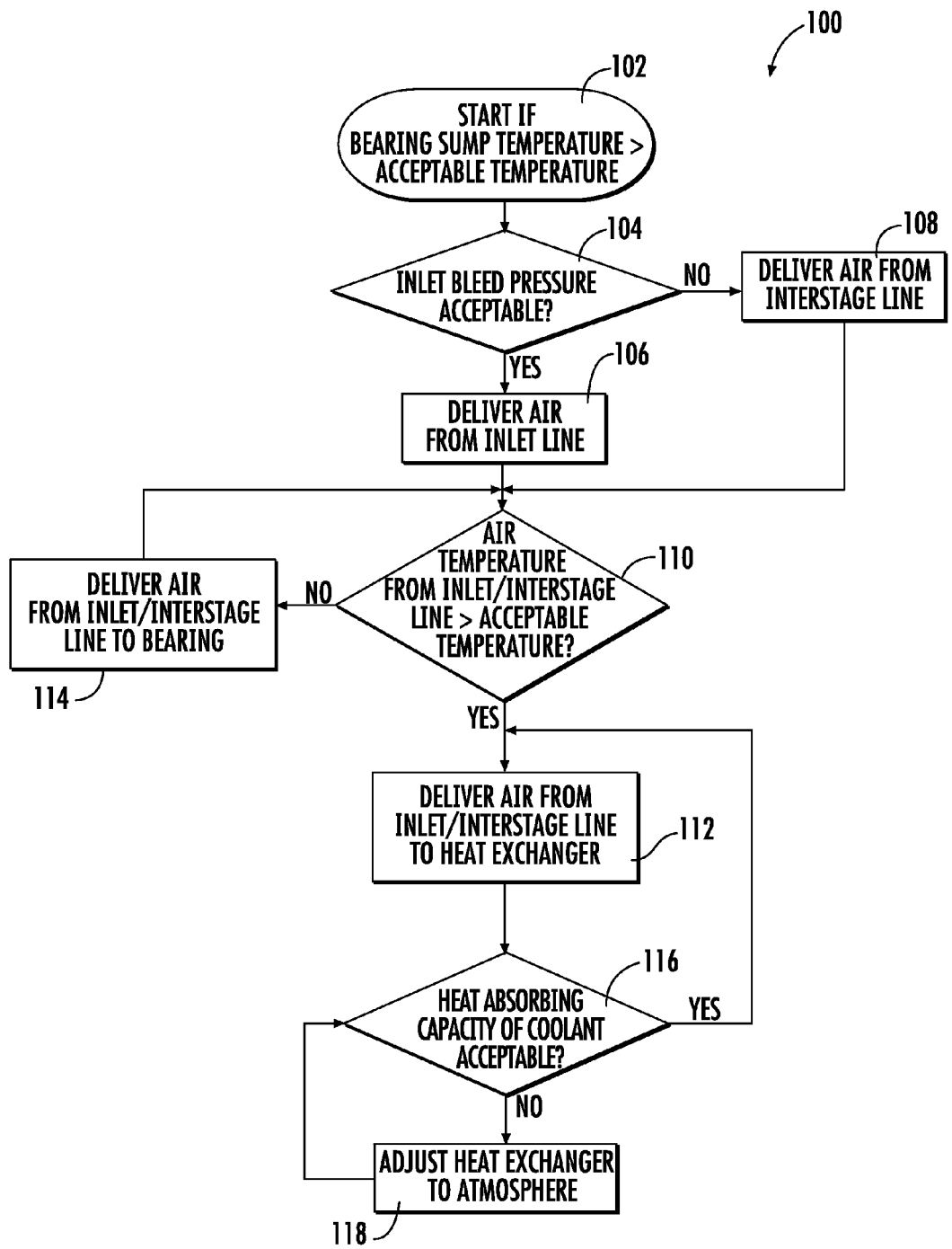
FIG. 2 depicts an embodiment of an operational sequence performed by a controller included in the gas turbine engine.

During operation of the gas turbine engine 10, with reference to FIG. 2, the controller 60 performs a step 102 of the operational sequence 100. In step 102, the controller 60 determines if the temperature of the bearings 28, 30 is above the acceptable operating temperature of each bearing 28, 30. In the illustrative embodiment, the temperature of each bearing 28, 30 is measured by the sensors 72, 74 positioned in the compressor and turbine sumps 32, 34, respectively. The controller 60 receives the input signals from each of the sensors 72, 74 and compares the temperature measurements associated with the input signals to the acceptable operating temperatures of each of the bearings 28, 30. The acceptable operating temperature of each of the bearings 28, 30 is stored as predetermined temperature values in the memory 76. Step 102 is shown in FIG. 2 as the initializing step of the operational sequence 100.

The controller 60 performs a step 104 of the operational sequence 100 in response to determining that the temperature of the bearings 28, 30 is above the acceptable operating temperature of the bearings 28, 30 as shown in FIG. 2. In step 104, the controller 60 determines if the measured pressure of the pressurized air in the inlet bleed line 48 is acceptable. In the illustrative embodiment, the pressure of the pressurized air in the inlet bleed line 48 is measured by the sensor 62 positioned between the inlet 18 and the bleed selection valve 56. The controller 60 receives the input signal from the sensor 62 and compares the pressure measurement associated with the input signal to a predetermined pressure value stored in the memory 76. In another embodiment, the controller 60 may determine if the measured pressure of pressurized air in the inlet bleed line 48 is acceptable by comparing the pressure measured in the inlet bleed line 48 by the sensor 62 to the pressure measured in the interstage compressor bleed line 50 by the sensor 64.

The controller 60 performs a step 106 of the operational sequence 100 in response to determining that the measured pressure of the pressurized air in the inlet bleed line 48 is acceptable in step 104 as shown in FIG. 2. In step 106, the controller 60 delivers pressurized air from the inlet bleed line 48 to the delivery line 44 through the bypass valve 54 using the bleed selection valve 56. After performing step 106, the controller 60 proceeds to a step 110 of the operational sequence 100.

The controller 60 performs a step 108 of the operational sequence 100 in response to determining that the measured pressure of the pressurized air in the inlet bleed line 48 is not acceptable in step 104 as shown in FIG. 2. In step 108, the controller 60 delivers pressurized air from the interstate compressor bleed line 50 to the delivery line 44 through the bypass valve 54 using the bleed selection valve 56. After performing step 108, the controller 60 proceeds to the step 110 of the operational sequence 100.

The controller 60 performs the step 110 of the operational sequence 100 in response to delivering pressurized air from the inlet bleed line 48 or the interstage compressor bleed line 50 to the delivery line 44 as indicated above in the steps 106, 108 as shown in FIG. 2. In step 110, the controller 60 determines if the measured temperature of the pressurized air provided by the inlet bleed line 48 or the interstage compressor bleed line 50 is above an acceptable temperature value. In the illustrative embodiment, the temperature of the air provided by the inlet bleed line 48 or the interstage compressor bleed line 50 is measured by the sensor 68. The controller 60 receives the input signal from the sensor 68 and compares the temperature associated with the input signal to the acceptable temperature value. The acceptable temperature value is illustratively the acceptable operating temperature(s) associated with each of the bearings 28, 30.

The controller 60 performs a step 112 of the operational sequence 100 in response to determining that the measured temperature of the pressurized air from the inlet bleed line 48 or the interstage compressor bleed line 50 is above the acceptable temperature value in step 110 as shown in FIG. 2. In step 112, the controller 60 delivers pressurized air provided by the inlet bleed line 48 or the interstage compressor bleed line 50 to the heat exchanger 46 using the bypass valve 54. Pressurized air delivered to the heat exchanger 46 is cooled by the heat exchanger 46 and delivered thereafter to the bearing sump 114 through the delivery line 44. After performing step 112, the controller 60 proceeds to a step 116 of the operational sequence 100.

The controller 60 performs a step 114 of the operational sequence 100 in response to determining that the measured temperature of the pressurized air from the inlet bleed line 48 or the interstage compressor bleed line 50 is not above the acceptable temperature value in step 110 as shown in FIG. 2. In step 114, the controller 60 delivers pressurized air provided by the inlet bleed line 48 or the interstage compressor line 50 to the bearing sump 14 using the bypass valve 54. Pressurized air provided by the inlet bleed line 48 or the interstage compressor bleed line 50 and delivered to the bearing sump 14 in step 114 is not cooled by the heat exchanger 46. After performing step 114, the controller 60 returns to step 110 of the operational sequence 100.

The controller performs a step 116 of the operational sequence 100 in response to delivering pressurized air from inlet bleed line 48 or the interstage compressor bleed line 50 to the heat exchanger 46 in step 112 as shown in FIG. 2. In step 116, the controller 60 determines whether the heat absorbing capacity of the coolant in the heat exchanger 46 is acceptable. The heat absorbing capacity of the coolant decreases when the coolant (i.e., water) changes phase as a result of absorbing heat from the pressurized air provided to the heat exchanger 46. The coolant pressure and temperature is measured via the sensors 64, 70 as the coolant absorbs heat and approaches a pressure and temperature value associated with the phase change.

The heat absorbing capacity of the coolant is acceptable if the measured pressure, temperature of the coolant does not reach the pressure, temperature associated with the phase change. In the illustrative embodiment, the controller 60 receives input signals associated with the measured pressure and temperature of the coolant from the sensors 64, 70. The controller 60 compares the pressure, temperature of the coolant measured via the sensors 64, 70 to the pressure, temperature values associated with the phase change to determine if the heat absorbing capacity of the coolant is acceptable. The pressure, temperature values associated with the phase change may be stored as predetermined pressure, temperature values in the memory 76.

The controller 60 performs a step 118 of the operational sequence 100 in response to determining that the heat absorbing capacity of the coolant is not acceptable in step 116 as shown in FIG. 2. In step 118, the controller 60 to adjusts the pressure in the heat exchanger 46 using the vent valve 52. Specifically, the controller 60 vents coolant to the atmosphere using the vent valve 52 based on the measured temperature of the coolant to control the pressure and phase of the coolant in order to provide a predetermined amount of cooling to pressurized air moving through the heat exchanger 46. In the illustrative embodiment, the controller 60 receives input signals from the sensors 64, 70 associated with the measured pressure and temperature of the coolant.

The controller 60 vents coolant to the atmosphere using the vent valve 52 when the measured pressure and temperature of the coolant approaches the pressure, temperature values associated with the phase change indicated above. The predetermined amount of cooling may be stored as a predetermined cooling value in the memory 76. After performing step 118, the controller 60 returns to step 116.

The controller 60 returns to the step 112 of the operational sequence 100 in response to determining that the heat absorbing capacity of the coolant is acceptable in step 116 as shown in FIG. 2. Steps 112, 116, and 118 of the operational sequence 100 are performed by the controller 60 until the controller 60 vents all the coolant in the heat exchanger 46 to the atmosphere using the vent valve 52.

One method of operating the gas turbine engine 10 includes a first step of conducting lubricant from the lubricant reservoir 36 to the bearing sump 14. Lubricant is conducted from the lubricant reservoir 36 to the bearing sump using the lubricant delivery line 42.

The method may include a second step of conducting pressurized air to the bearing sump 14 from the engine core 12 to blow lubricant onto one of the bearings 28, 30. Pressurized air is conducted to the bearing sump 14 from the engine core 12 via either the inlet bleed line 48 and the interstage compressor line 50 and the delivery line 44.

The method may include a third step of venting substantially all the lubricant and pressurized air from the bearing sump 14 to the atmosphere without recirculating the lubricant so that heat absorbed from the bearing sump 14 by the lubricant and the pressurized air is removed from the bearing sump 14. Lubricant and pressurized air is vented from the bearing sump 14 to the atmosphere via the vent 40.

The method may include a fourth step of cooling the pressurized air from the engine core 12 by passing the pressurized air through the heat exchanger 46. Pressurized air from the engine core 12 is provided to the heat exchanger 46 for cooling from one of the inlet bleed line 48 and the interstage compressor bleed line 50.

The method may include a fifth step of venting coolant from the heat exchanger 46 to the atmosphere during operation of the gas turbine engine 10 based on the temperature of the coolant to control pressure and phase of the coolant in order to provide a predetermined amount of cooling to pressurized air passing through the heat exchanger 46. Coolant is vented from the heat exchanger 46 to the atmosphere using the vent valve 52. The steps of the method described herein may be reordered or performed in part in some embodiments of the present disclosure.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine comprising
an engine core including an inlet, a compressor, a turbine, and an exhaust,
a bearing sump arranged in the engine core, and
a non-recirculating lubrication system including a lubricant reservoir coupled to the bearing sump to provide lubricant to the bearing sump, an air system coupled to the bearing sump and configured to provide pressurized air to the bearing sump to cool a bearing included in the bearing sump and to blow lubricant onto the bearing, and a vent coupled to the bearing sump and to the atmosphere, wherein the vent is sized to conduct the lubricant provided by the lubricant reservoir and pressurized air provided by the air system to the atmosphere after the lubricant and pressurized air enter the bearing sump so that lubricant is not recirculated in the bearing sump,
wherein the air system includes a heat exchanger filled with a coolant and configured to cool pressurized air before delivery to the bearing sump, and
wherein the air system includes a vent valve coupled to the heat exchanger and configured to vent coolant to the atmosphere during operation of the gas turbine engine based on the temperature of the coolant to control pressure and phase of the coolant in the heat exchanger in order to provide a predetermined amount of cooling to pressurized air passing through the heat exchanger.

2. The gas turbine engine of claim 1, wherein the vent is coupled to the exhaust of the engine core so that the lubricant and pressurized air conducted away from the bearing sump is deposited into an air stream exiting the gas turbine engine.

3. The gas turbine engine of claim 1, wherein the air system includes a delivery line coupled to the bearing sump to deliver pressurized air to the bearing sump and an interstage compressor bleed line coupled to the compressor to receive pressurized air from the compressor for transportation to the bearing by the delivery line.

4. The gas turbine engine of claim 3, wherein the air system includes an inlet bleed line coupled to the inlet to receive pressurized air from the inlet for transportation to the bearing by the delivery line.

5. The gas turbine engine of claim 4, wherein the air system includes a bleed selection valve configured to selectively couple the delivery line to the interstage compressor bleed line or the inlet bleed line.

6. The gas turbine engine of claim 1, wherein the air system includes a bypass valve configured to selectively bypass the heat exchanger to deliver uncooled pressurized air to the bearing sump.

7. The gas turbine engine of claim 6, wherein the air system includes a delivery line coupled to the bearing sump to deliver pressurized air to the bearing sump, an interstage compressor bleed line coupled to the compressor to receive pressurized air from the compressor for transportation to the bearing by the delivery line, and an inlet bleed line coupled to the inlet to receive pressurized air from the inlet for transportation to the bearing by the delivery line.

8. The gas turbine engine of claim 7, wherein the air system includes a bleed selection valve configured to selectively couple the delivery line to the interstage compressor bleed line or the inlet bleed line.

9. A gas turbine engine comprising
an engine core including an inlet, a compressor, a turbine, and an exhaust
a bearing sump arranged in the engine core, and
an air system coupled to the bearing sump and configured to provide pressurized air to the bearing sump to cool a bearing included in the bearing sump, the air system including (i) a delivery line coupled to the bearing sump to deliver pressurized air to the bearing sump, (ii) a first bleed line coupled to the engine core to receive pressurized air from the engine core for transportation to the bearing by the delivery line, (iii) a heat exchanger filled with a coolant coupled between the delivery line and the first bleed line to cool air before delivery to the bearing sump, and (iv) a vent valve coupled to the heat exchanger, the vent valve configured to vent coolant to the atmosphere during operation of the gas turbine engine based on the temperature of the coolant to control pressure and phase of the coolant in the heat exchanger in order to provide a predetermined amount of cooling to pressurized air passing through the heat exchanger.

10. The gas turbine engine of claim 9, wherein the air system includes a bypass valve configured to selectively bypass the heat exchanger to deliver uncooled pressurized air from the engine core to the bearing sump if the air temperature at the first bleed line is below a predetermined temperature.

11. The gas turbine engine of claim 9, wherein the air system includes a second bleed line coupled to the engine core to receive pressurized air from a different part of the engine core for transportation to the bearing by the delivery line and a bleed section valve configured to selectively couple the delivery line to the first bleed line or the second bleed line.

12. The gas turbine engine of claim 11, wherein the heat exchanger is coupled between the delivery line and the second bleed line.

13. The gas turbine engine of claim 11, wherein the first bleed line is coupled to the inlet of the engine core and the second bleed line is coupled to the compressor of the engine core.

14. The gas turbine engine of claim 9, further comprising a lubrication reservoir coupled to the bearing sump to provide lubricant to the bearing sump and a vent line coupled to the bearing sump to the atmosphere to conduct lubricant from the bearing sump to the atmosphere.

15. The gas turbine engine of claim 14, wherein the vent line is sized to conduct the lubricant from the lubricant reservoir and pressurized air from the air system to the atmosphere from the bearing sump so that lubricant is no recirculated into the bearing sump.

16. A method of operating a gas turbine engine comprising
conducting lubricant from a lubricant reservoir to a bearing sump included in the gas turbine engine,
conducting pressurized air to the bearing sump from an engine core included in the gas turbine engine to blow the lubricant onto a bearing included in the bearing sump,
venting substantially all the lubricant and pressurized air from the bearing sump to the atmosphere without recirculating the lubricant so that heat absorbed from the bearing sump by the lubricant and the pressurized air is removed from the bearing sump,
cooling the pressurized air from the engine core by passing the pressurized air through a heat exchanger filled with coolant, and
venting coolant from the heat exchanger to the atmosphere during operation of the gas turbine engine based on the temperature of the coolant to control pressure and phase of the coolant in the heat exchanger in order to provide a predetermined amount of cooling to pressurized air passing through the heat exchanger.

17. A gas turbine engine comprising
an engine core including an inlet, a compressor, a turbine, and an exhaust,
a bearing sump arranged in the engine core, and
a non-recirculating lubrication system including a lubricant reservoir coupled to the bearing sump to provide lubricant to the bearing sump, an air system coupled to the bearing sump and configured to provide pressurized air to the bearing sump to cool a bearing included in the bearing sump and to blow lubricant onto the bearing, and a vent coupled to the bearing sump and to the atmosphere, wherein the vent is sized to conduct the lubricant provided by the lubricant reservoir and pressurized air provided by the air system to the atmosphere after the lubricant and pressurized air enter the bearing sump so that lubricant is not recirculated in the bearing sump,
wherein the air system includes a delivery line coupled to the bearing sump to deliver pressurized air to the bearing sump and an interstage compressor bleed line coupled to the compressor to receive pressurized air from the compressor for transportation to the bearing by the delivery line, and
wherein the air system includes an inlet bleed line coupled to the inlet to receive pressurized air from the inlet for transportation to the bearing by the delivery line.

18. The gas turbine engine of claim 17, wherein the air system includes a bleed selection valve configured to selectively couple the delivery line to the compressor bleed line or the inlet bleed line.

19. The gas turbine engine of claim 17, wherein the vent is coupled to the exhaust of the engine core so that the lubricant and pressurized air conducted away from the bearing sump is deposited into an air stream exiting the gas turbine engine.

20. The gas turbine engine of claim 17, wherein the air system includes a heat exchanger filled with a coolant and configured to cool pressurized air before delivery to the bearing sump and wherein the air system includes a bypass valve configured to selectively bypass the heat exchanger to deliver uncooled pressurized air to the bearing sump.

* * * * *